(12) United States Patent
Kellermann (10) Patent No.: US 7,568,137 B1
(45) Date of Patent: Jul. 28, 2009

(54) METHOD AND APPARATUS FOR A CLOCK AND DATA RECOVERY CIRCUIT

(75) Inventor: Martin Johann Kellermann, Egmating (DE)

(73) Assignee: XILINX, Inc., San Jose, CA (US)

( * ) Notice: Subject to any disclaimer, the term of this patent is extended or adjusted under 35 U.S.C. 154(b) by 314 days.

(21) Appl. No.: 11/729,205

(22) Filed: Mar. 27, 2007

(51) Int. Cl.
*G01R 31/28* (2006.01)
*H03M 13/00* (2006.01)

(52) U.S. Cl. ...................................... 714/725; 714/755
(58) Field of Classification Search ................... 714/725
See application file for complete search history.

(56) References Cited

U.S. PATENT DOCUMENTS

| | | | | |
|---|---|---|---|---|
| 5,181,207 | A * | 1/1993 | Chapman | 714/755 |
| 6,662,332 | B1 * | 12/2003 | Kimmitt | 714/762 |
| 7,206,981 | B2 * | 4/2007 | Schoenborn et al. | 714/724 |
| 7,464,241 | B2 * | 12/2008 | Vogt | 711/168 |
| 7,500,170 | B2 * | 3/2009 | Wiatrowski et al. | 714/758 |
| 2006/0253763 | A1 * | 11/2006 | Oliva et al. | 714/746 |
| 2007/0260965 | A1 * | 11/2007 | Schmidt et al. | 714/799 |
| 2008/0162998 | A1 * | 7/2008 | Likovich et al. | 714/28 |

\* cited by examiner

*Primary Examiner*—James C Kerveros
(74) *Attorney, Agent, or Firm*—Michael T. Wallace (57) ABSTRACT

A method and apparatus for a clock and data recovery circuit that includes a set of serializer/deserializer (SERDES) circuits that are adapted to sample progressively delayed versions of an input data stream. The sampling rate is slightly higher than the data rate of the input data stream, which produces duplicate bits in the detected data stream. Error and offset matrices are used to generate an index pointer into a detected data matrix to extract the correct data bits from the duplicate bits of the detected data matrix. Down-sampling of the corrected data is performed to populate a ring buffer. Data is then extracted from the ring buffer using a clock signal whose frequency is adapted from the sampling clock signal used by the SERDES to prevent underflow/overflow of the ring buffer.

20 Claims, 8 Drawing Sheets

METHOD AND APPARATUS FOR A CLOCK AND DATA RECOVERY CIRCUIT

FIELD OF THE INVENTION

The present invention generally relates to programmable logic devices (PLDs), and more particularly to PLDs configured for clock and data recovery without use of dedicated transceiver circuitry.

BACKGROUND

PLDs are a well-known type of integrated circuit that may be programmed to perform specified logic functions. One type of PLD, the Field Programmable Gate Array (FPGA), typically includes an array of programmable tiles. These programmable tiles can include, for example, Input/Output Blocks (IOBs), Configurable Logic Blocks (CLBs), dedicated Random Access Memory Blocks (BRAM), multipliers, Digital Signal Processing blocks (DSPs), processors, clock managers, Delay Lock Loops (DLLs), Multi-Gigabit Transceivers (MGTs) and so forth.

Each programmable tile typically includes both programmable interconnect and programmable logic. The programmable interconnect typically includes a large number of interconnect lines of varying lengths interconnected by Programmable Interconnect Points (PIPs). The programmable logic implements the logic of a user design using programmable elements that may include, for example, function generators, registers, arithmetic logic, and so forth.

The programmable interconnect and the programmable logic are typically programmed by loading a stream of configuration data into internal configuration memory cells that define how the programmable elements are configured. The configuration data may be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to Input/Output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

For all of these PLDs, the functionality of the device is determined by the data bits used to configure the reconfigurable resources of the device. The data bits can be stored in volatile memory (e.g., static memory cells, as in FPGAs and some CPLDs), in non-volatile memory (e.g., FLASH memory, as in some CPLDs), or in any other type of memory cell.

Some PLDs, such as the Xilinx Virtex® FPGA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, DSP functions, memories, storage elements, and math functions. Some cores include an optimally floor planned layout targeted to a specific family of FPGAs. Cores can also be parameterizable, i.e., allowing the user to enter parameters to activate or change certain core functionality.

Some PLDs may incorporate MGTs to facilitate the exchange of high data rate serial data, whereby phase locked loop (PLL) structures may be used to maintain phase coherence between the transmit and receive portions of the MGT. Should the particular PLD be void of transceiver capability, however, then the exchange of serial data at gigabit transfer rates is all but precluded. Thus, a need exists to provide multi-gigabit transceiver functionality notwithstanding the absence of conventional MGTs within the PLD.

SUMMARY

To overcome limitations in the prior art, and to overcome other limitations that will become apparent upon reading and understanding the present specification, various embodiments of the present invention disclose an apparatus and method to provide multi-gigabit transceiver functionality within programmable logic devices (PLDs) that are void of dedicated multi-gigabit transceiver (MGT) circuits.

In accordance with one embodiment of the invention, a clock and data recovery circuit comprises a plurality of receiver segments that are coupled to receive an input data stream. Each receiver segment includes a plurality of deserializers adapted to sample programmably delayed representations of the input data stream to generate a plurality of data words. The clock and data recovery circuit further comprises an error correction block that is coupled to receive the plurality of data words and is adapted to remove duplicative data from the plurality of data words and merge each of the plurality of data words into detected data words.

In accordance with another embodiment of the invention, a method of recovering data signals from an input data stream having a data rate comprises generating a plurality of data word streams from data samples taken from a plurality of data bit streams, where each data bit stream exhibits a different delay in relation to the input data stream. The method further comprises detecting error bits within the plurality of data words and extracting data bits from the plurality of data words, where the extracted data bits are void of the detected error bits. The method further comprises down-sampling the extracted data bits to recover the data signals from the input data stream.

In accordance with another embodiment of the invention, a method of recovering data signals from an input data stream within a programmable logic device comprises receiving the input data stream using input/output pins of the programmable logic device, routing the input data stream to a plurality of receiver segments associated with the input/output pins, delaying the input data stream in each receiver segment using a programmable delay for each receiver segment, generating a plurality of data words from data samples taken from the delayed data streams in each receiver segment, extracting non-duplicative data bits from the plurality of data words, and down-sampling the extracted data bits to recover the data signals from the input data stream.

BRIEF DESCRIPTION OF THE DRAWINGS

Various aspects and advantages of the invention will become apparent upon review of the following detailed description and upon reference to the drawings in which.

DETAILED DESCRIPTION

Generally, various embodiments of the present invention are applied to the field of integrated circuits (ICs) of which programmable logic devices (PLDs) are a subset. In particular, a method and apparatus is provided for the implementation of clock and data recovery without the use of dedicated multi-gigabit transceiver (MGT) circuits. Multiple input pins and associated input/output (I/O) circuitry are combined in parallel to correctly recover encoded, serialized data that is transmitted asynchronously to the PLD.

In one embodiment, the transmission line used to transmit data to the PLD is configured to drive three parallel receiver segments. The termination impedance of each receiver segment is controlled so that the impedance of the parallel combination of the receiver segments is substantially equal to the characteristic impedance of the transmission line. I/O blocks (IOBs) within the PLD may then be configured to process data from within each of the three receiver segments.

The IOBs used to process data streams from within each of the three receiver segments are configured with varying delays, so that multiple sampling instances of the incoming data bits may be facilitated. Sampling of the input data stream is performed by a deserializer at a higher sampling rate relative to the data rate of the input data stream, so as to prevent data loss due to asynchronous transmission/reception. Due to the higher sampling rate utilized by the deserializer, however, certain data bits are detected twice, which results in redundant data bits. Thus, additional circuitry and processing within the deserializer is employed to detect and eliminate the redundant bits.

Through utilization of I/O devices implemented within most PLDs, therefore, deserialization of an input data stream may be facilitated regardless of the absence of dedicated multi-gigabit transceiver functionality within the PLD. In particular, multiple data pins are used to sample the input data stream at varying sampling instances using, for example, the programmable IOB delay function. Using information gathered by the multiple data pins, clock and data recovery is facilitated using error detection, error correction, voting, and data merging circuitry and processing as discussed in more detail below.

As noted above, advanced ICs, such as FPGAs, can include several different types of programmable logic blocks in the array. For example, FIG. 1 illustrates an IC that exemplifies FPGA architecture 100, including a large number of different programmable tiles such as optional Multi-Gigabit Transceivers (MGTs) 101, Configurable Logic Blocks (CLBs) 102, dedicated Random Access Memory Blocks (BRAMs) 103, Input/Output Blocks (IOBs) 104, configuration and clocking logic CONFIG/CLOCKS 105, Digital Signal Processing blocks (DSPs) 106, specialized I/O 107, including configuration ports and clock ports, and other programmable logic 108, such as digital clock managers, analog-to-digital converters, system monitoring logic, and so forth.

In some FPGAs, each programmable tile includes programmable interconnect element INT 111 having standardized connections to and from a corresponding interconnect element in each adjacent tile. Therefore, the programmable interconnect elements taken together implement the programmable interconnect structure for the illustrated FPGA. INT 111 also includes the connections to and from the programmable logic element within the same tile, as shown by the examples of blocks 102 and 104. For example, a CLB 102 may include a Configurable Logic Element (CLE) 112 that may be programmed to implement user logic plus a single programmable interconnect element (INT) 111. A BRAM 103 can include a BRAM logic element (BRL) 113 in addition to one or more programmable interconnect elements.

Figure 1:
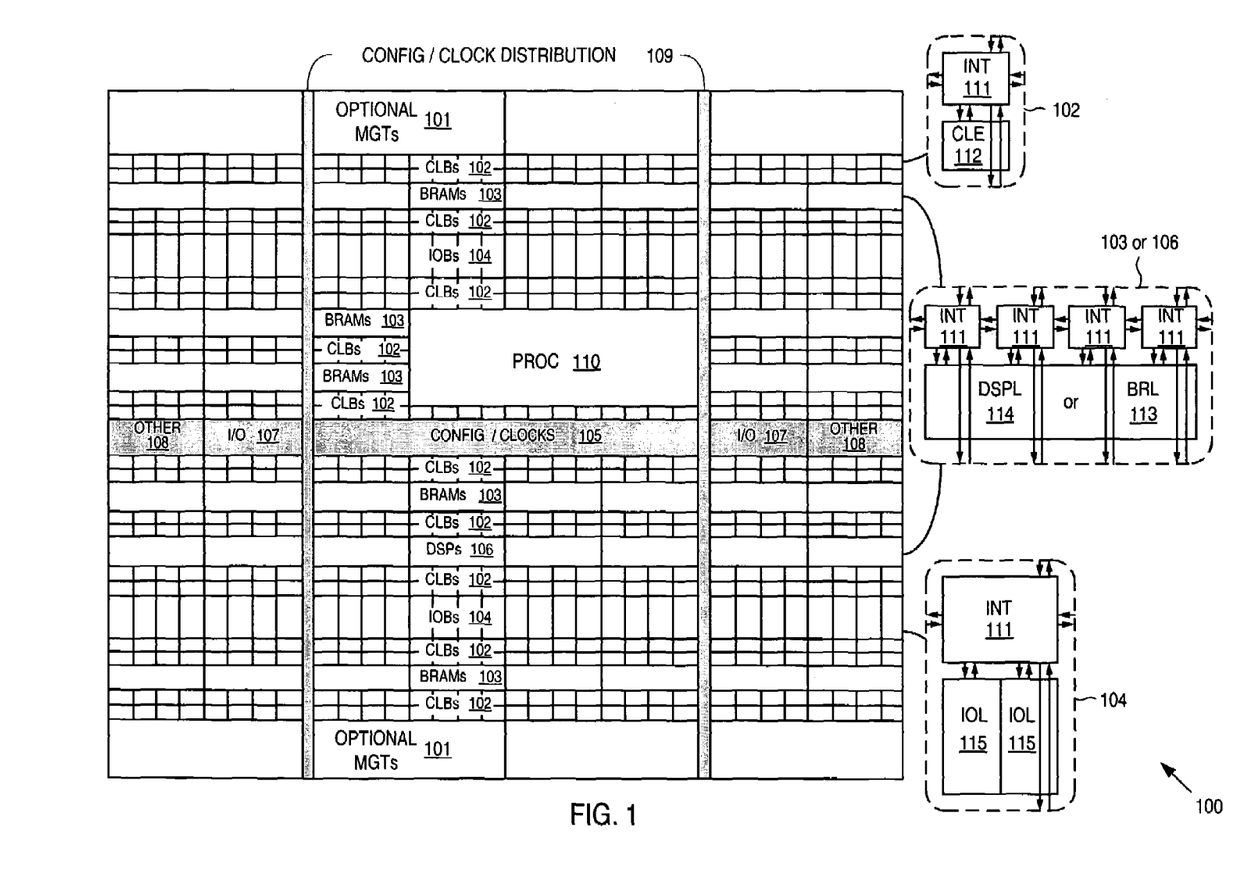
FIG. 1 illustrates an exemplary Field Programmable Gate Array (FPGA) architecture.

Typically, the number of interconnect elements included in a tile depends on the height of the tile (as measured from right to left of FIG. 1). In the pictured embodiment, a BRAM tile has the same height as four CLBs, but other quantities (e.g., five) can also be used. A DSP tile 106 can include a DSP logic element (DSPL) 114) in addition to an appropriate number of programmable interconnect elements. An IOB 104 may include, for example, two instances of an input/output logic element IOL 115 in addition to one instance of the programmable interconnect element INT 111.

As will be clear to those of skill in the art, the actual I/O pads connected, for example, to the I/O logic element 115 are manufactured using metal layers above the various illustrated logic blocks, and typically are not confined to the area of the input/output logic element 115. In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 may span several columns of CLBs and BRAMs. Note that FIG. 1 is intended to illustrate only an exemplary FPGA architecture. The number of logic blocks in a column, the relative width of the columns, the number and order of columns, the type of logic blocks included in the columns, the relative size of the logic blocks, and the interconnect/logic implementations 102, 103, and 104 are purely exemplary. For example, in an actual FPGA more than one adjacent column of CLBs is typically included wherever the CLBs appear, to facilitate the efficient implementation of user logic.

Figure 2:
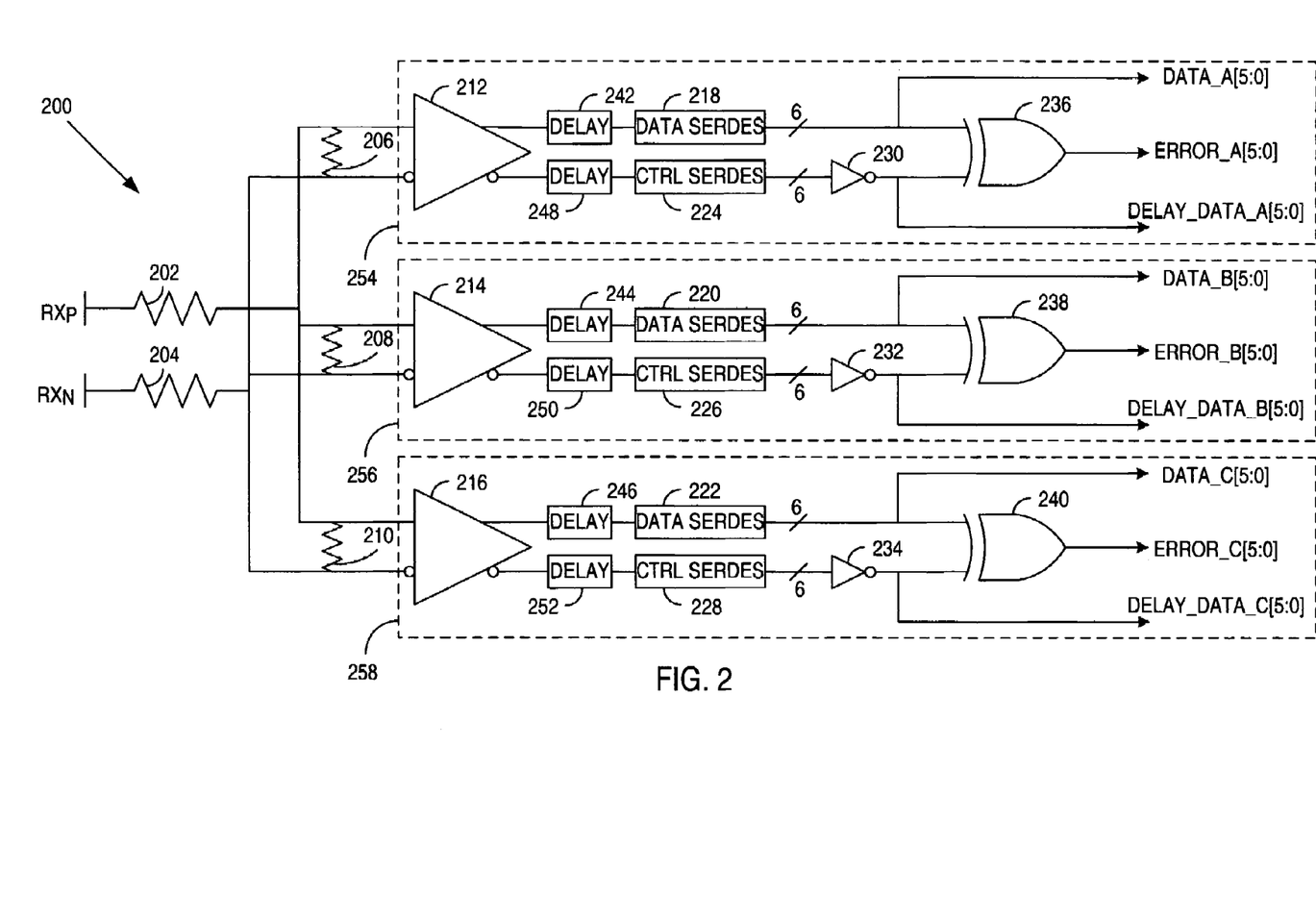
FIG. 2 illustrates an exemplary receiver block diagram.

Turning to FIG. 2, exemplary receiver block diagram 200 is illustrated, whereby a single differential data stream may be received at terminals $RX_P$ and $RX_N$ of a PLD and delivered to multiple receiver segments, 254-258, that are connected in parallel with each other. In one embodiment, three receiver segments are connected in parallel as shown, where terminal $RX_P$ is coupled to the non-inverting input of amplifiers 212-216 via resister 202 and terminal $RX_N$ is coupled to the inverting input of amplifiers 212-216 via resister 204.

In this embodiment, resistors 206-210 represent internal termination resistors within the PLD. Series coupled resistors 202,204 and parallel coupled resistors 206-210 are implemented to match the impedance of the characteristic impedance of the transmission line (not shown) that is coupled to terminals $RX_P$ and $RX_N$. For example, given that the differential characteristic impedance of the transmission line is equal to 100 ohms, then a resistance magnitude of 100 ohms for each resistor 206-210 and a resistance magnitude of 33 ohms for each resistor 202-204 should be selected. In such an instance, the differential impedance magnitude across terminals $RX_P$ and $RX_N$ is approximately equal to 99 ohms, which is adequate to match the 100 ohm characteristic impedance of the differential transmission line.

Since the input data stream is divided between three receiver segments, however, the voltage magnitude of each data bit in each receiver segment is reduced to approximately ⅓ of its original voltage magnitude. Amplifiers 212-216 are, therefore, utilized to restore the voltage magnitude of each data bit within each receiver segment, respectively, to its original voltage magnitude.

Components exhibiting a programmable delay, such as the IOBs discussed above in relation to FPGA 100 of FIG. 1, may then be utilized at the output of amplifiers 212-216 to provide the amount of delay in each receiver segment that is required for the first step of data recovery. In other words, delay blocks 242-252 are utilized so that sampling instances relative to SERDES blocks 218-228 for each data bit of each receiver segment may be programmably selected. As such, each data bit may be sampled at multiple instances within each unit interval, i.e., bit period.

Figure 3:
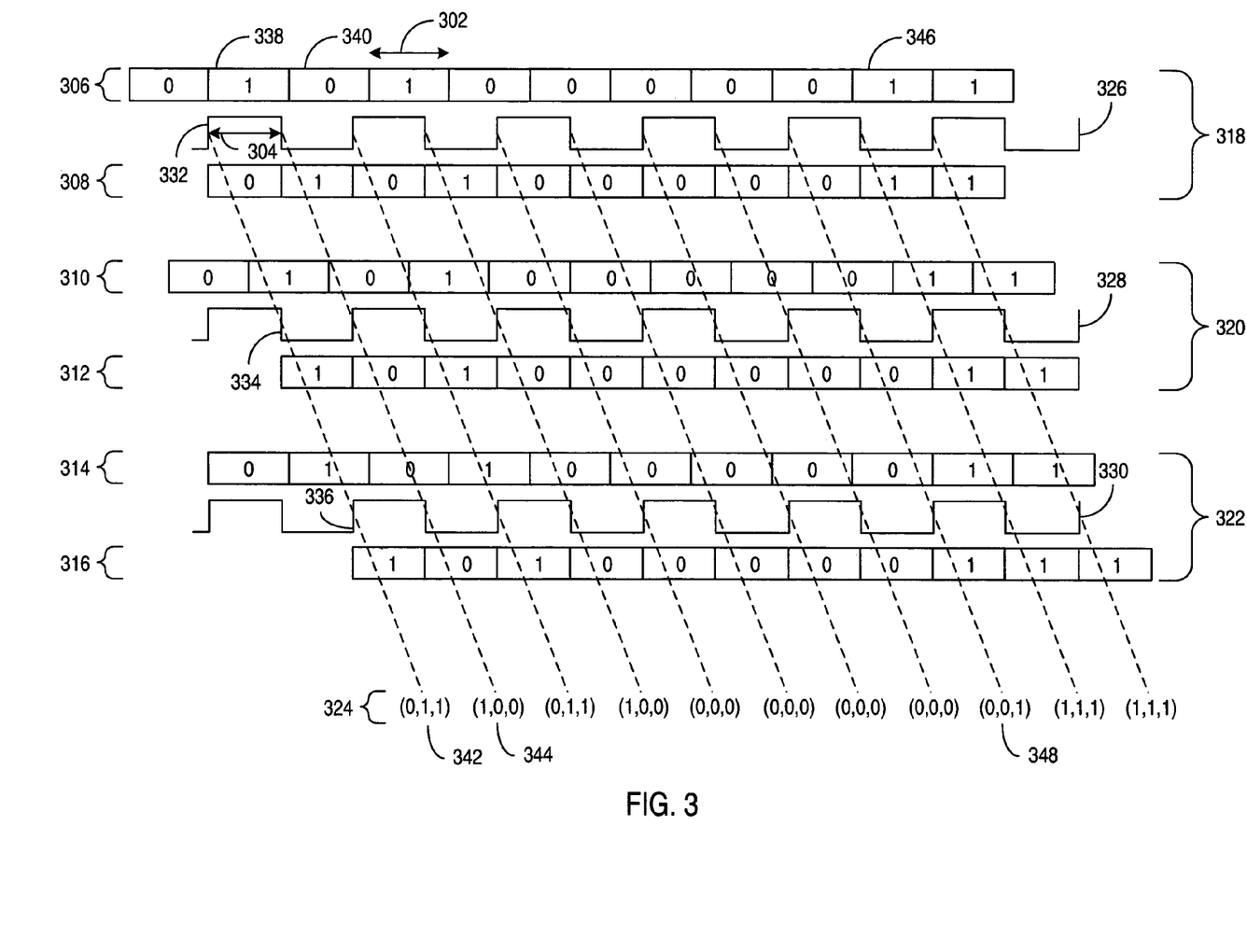
FIG. 3 illustrates an exemplary timing diagram associated with the receiver of FIG. 2.

Turning to FIG. 3, an exemplary timing diagram is illustrated, whereby the sampling instances within each of the three receiver segments are illustrated. Timing diagram 318 illustrates, for example, the timing relationship between data stream 306, that is produced at the output of delay block 242, and sampling clock signal 326, used by data SERDES 218 of receiver segment 254, to detect data stream 306. Furthermore, timing diagram 320 exemplifies the timing relationship between data stream 310, that is produced at the output of delay block 244, and sampling clock signal 328, used by data SERDES 220 of receiver segment 256, to detect data stream 310. Still further, timing diagram 322 exemplifies the timing relationship between data stream 314, that is produced at the output of delay block 246, and sampling clock signal 330, used by data SERDES 222 of receiver segment 258, to detect data stream 314.

Data streams 306, 310, and 314 are illustrative of delayed versions of the input data stream that may be present at the $RX_P$ and $RX_N$ terminals of FIG. 2. It is noted that the unit interval of data streams 306, 310, and 314, as exemplified by bit period 302, is longer than the sampling clock period, as exemplified by sample clock period 304, of the respective sampling clock signals. In one embodiment, for example, the unit interval of data streams 306, 310, and 314 may be equal to 800 picoseconds (ps), which is equivalent to a data rate of 1.25 gigabits per second (Gbps). The frequency of the sampling clock signals used by each of data SERDES 218-222, however, is set to be at a slightly higher frequency than the data rate, such that the period of the sampling clock is set to be, for example, 720 ps. Thus, in one embodiment, the sampling clock period is set to be approximately 10% shorter than the unit interval of each data bit within data streams 306, 310, and 314. Other embodiments, however, may implement an 8% or 12% shorter sampling clock period as compared to the unit interval of each data bit within data streams 306, 310, and 314.

Turning to the sampling instances relative to receiver segment 254, data stream 306 represents the output of delay block 242 after it has been amplified by amplifier 212. As discussed above, delay block 242 may be implemented, for example, within an IOB of FPGA 100 of FIG. 1 and may exhibit a programmable delay setting of, e.g., 0 ps. Sampling clock signal 326 may then be utilized by data SERDES 218 to sample the incoming data stream 306. As such, data stream 308 is a representation of data stream 306 as sampled by data SERDES 218.

It is noted that sampling clock signal 326 is operating at a frequency that is slightly greater than but less than twice the data rate of data stream 306. Sampling of data stream 306 begins at rising edge 332 of sampling clock signal 326 and subsequent samples are taken at each rising and falling edge of sampling clock 326 to implement a double data rate (DDR) mode of operation. It can be seen by inspection, that data stream 308 exactly replicates input data stream 306.

Turning to the sampling instances relative to receiver segment 256, data stream 310 represents the output of delay block 244 after it has been amplified by amplifier 214. As discussed above, delay block 244 may be implemented, for example, within an IOB of FPGA 100 of FIG. 1 and may exhibit a programmable delay setting of, e.g., 400 ps, which is one half of unit interval 302. Sampling clock signal 328 may then be utilized by data SERDES 220 to sample delayed data stream 310. As such, data stream 312 is a representation of data stream 310 as sampled by data SERDES 220.

It is noted that sampling clock signal 328 is operating at a frequency that is slightly greater than but less than twice the data rate of data stream 310. Sampling of data stream 310 begins at falling edge 334 of sampling clock signal 328 and subsequent samples are taken at each rising and falling edge of sampling clock signal 328 to implement a DDR mode of operation. It can be seen by inspection, however, that data stream 312 does not exactly replicate data stream 310. In particular, data stream 312 begins with a logic high value, as compared to the logic low value of data stream 310 and data stream 312 contains a run length of 6 logic low values, as compared to the run length of 5 logic low values within data stream 310.

Turning to the sampling instances relative to receiver segment 258, data stream 314 represents the output of delay block 246 after it has been amplified by amplifier 216. As discussed above, delay block 246 may be implemented, for example, within an IOB of FPGA 100 of FIG. 1 and may exhibit a programmable delay setting of, e.g., 800 ps, which is equal to unit interval 302. Sampling clock signal 330 may then be utilized by data SERDES 222 to sample delayed data stream 314. As such, data stream 316 is a representation of data stream 314 as sampled by data SERDES 222.

It is noted that sampling clock signal 330 is operating at a frequency that is slightly greater than but less than twice the data rate of data stream 314. Sampling of data stream 314 begins at rising edge 336 of sampling clock signal 330 and subsequent samples are taken at each rising and falling edge of sampling clock signal 330 to implement a DDR mode of operation. It can be seen by inspection, however, that data stream 316 does not exactly replicate data stream 314. In particular, data stream 316 begins with a logic high value, as compared to the logic low value of data stream 314, and ends with three logic high values, as compared to the two logic low values of data stream 314.

It can be seen, therefore, that by implementing a progressive delay and over-sampled timing structure as exemplified in FIGS. 2 and 3, the detected data values within each of the three receiver segments will not always agree. Implementation of a majority voting system, however, serves to mitigate a substantial portion of the discrepancies. In particular, by implementing a majority voting system on detected triplets 324, the detected data streams of each of the three receiver segments may be combined into a single data stream.

For example, a majority vote taken on triplet 342 of detected triplets 324 yields a voted logic value of "1", which corresponds to data bit 338. A majority vote taken on triplet 344 of detected triplets 324 yields a voted logic value of "0", which corresponds to the subsequent data bit 340. Majority voting continues to yield correct data values until triplet 348 is voted upon. In this instance, a majority vote taken on triplet 348 of the detected triplets 324 yields a voted logic value of "0", which does not correspond to the logic high value of subsequent data bit 346. Thus, it can be seen that additional processing is necessary to correctly implement clock and data recovery based upon the progressive delay and over-sampled timing structure as exemplified in FIGS. 2 and 3.

In order to accomplish the clock and data recovery processing, as discussed in more detail below, additional information is required. For example, a second data stream is generated from the complementary outputs of amplifiers 212-216, whereby delay blocks 248-252 may be similarly implemented within an IOB of FPGA 100 of FIG. 1. The delay values, however, of delay blocks 248-252 may be programmed to different values as compared to corresponding delay blocks 242-246, respectively. In one embodiment, for example, delay blocks 248-252 may exhibit slightly higher delay values, e.g., 80 ps, 480 ps, and 880 ps, respectively, as compared to the delay values of their corresponding delay blocks 242-246. Operation of CTRL SERDES 224-228 is identical to the operation of data SERDES 218-222 as discussed above in relation to FIGS. 2 and 3.

Data SERDES 218-222 and CTRL SERDES 224-228 exhibit a programmable deserialization factor of, e.g., 6, such that for each set of 6 bits that are sampled, a 6-bit data word is generated. Each 6-bit data word from CTRL SERDES 224-228 is then inverted by inverters 230-234 and provided to first inputs of XOR gates 236-240, respectively, as well as being provided as signals DELAY_DATA_A[5:0], DELAY_DATA_B[5:0], and DELAY_DATA_C[5:0], respectively. Each 6-bit data word from data SERDES 218-222 is provided to second inputs of XOR gates 236-240, respectively, as well as being provided as signals DATA_A[5:0], DATA_B[5:0], and DATA_C[5:0], respectively. The outputs of XOR gates 236-240 are provided as signals ERROR_A[5:0], ERROR_B[5:0], and ERROR_C[5:0], respectively.

Thus, receiver block diagram 200 represents an exemplary SERDES block diagram, whereby a single data stream is first split into three differential data streams and provided to each of three receiver segments. Each receiver segment provides complementary data paths, whereby the delay implemented for each data path is programmed such that six samples, on average, may be taken of each data bit of the single data stream as discussed above in relation to FIG. 3. Each of the six samples taken of each data bit may then be considered as comprising, on average, four "good" samples and two "bad" samples. In general, the four "good" samples are those samples taken within the center of each data bit and the "bad" samples are those samples taken at each bit edge.

Various logic operations are then employed on each sampled data stream of each receiver segment to provide a total of six data streams and three error data streams. As discussed in more detail below, each of the data and error data streams are then processed to ultimately achieve clock and data recovery of the input data stream without the need for dedicated transceiver circuitry.

Figure 4:
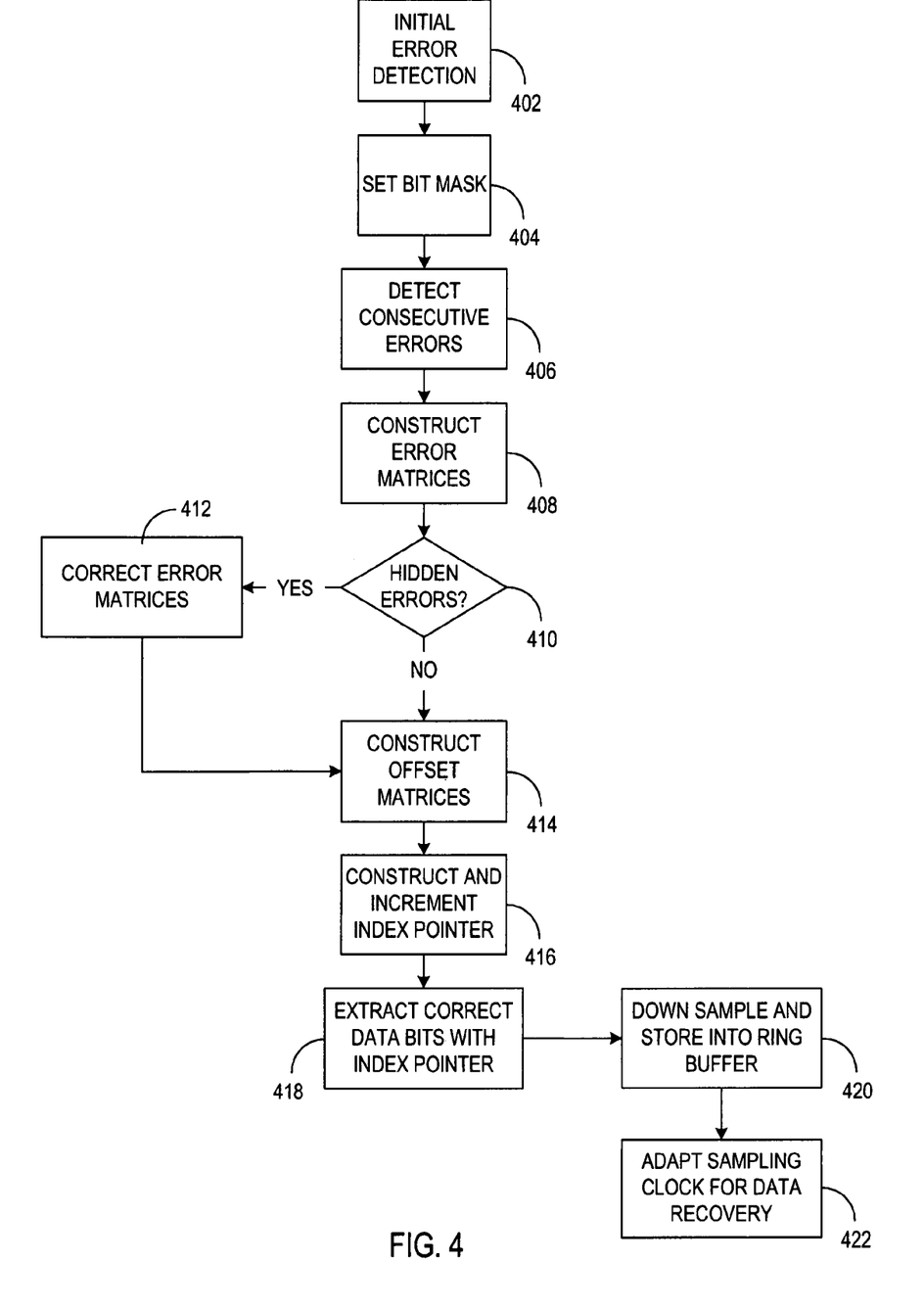
FIG. 4 illustrates an exemplary flow diagram of a method of performing clock and data recovery without dedicated transceiver circuitry.
Figure 5:
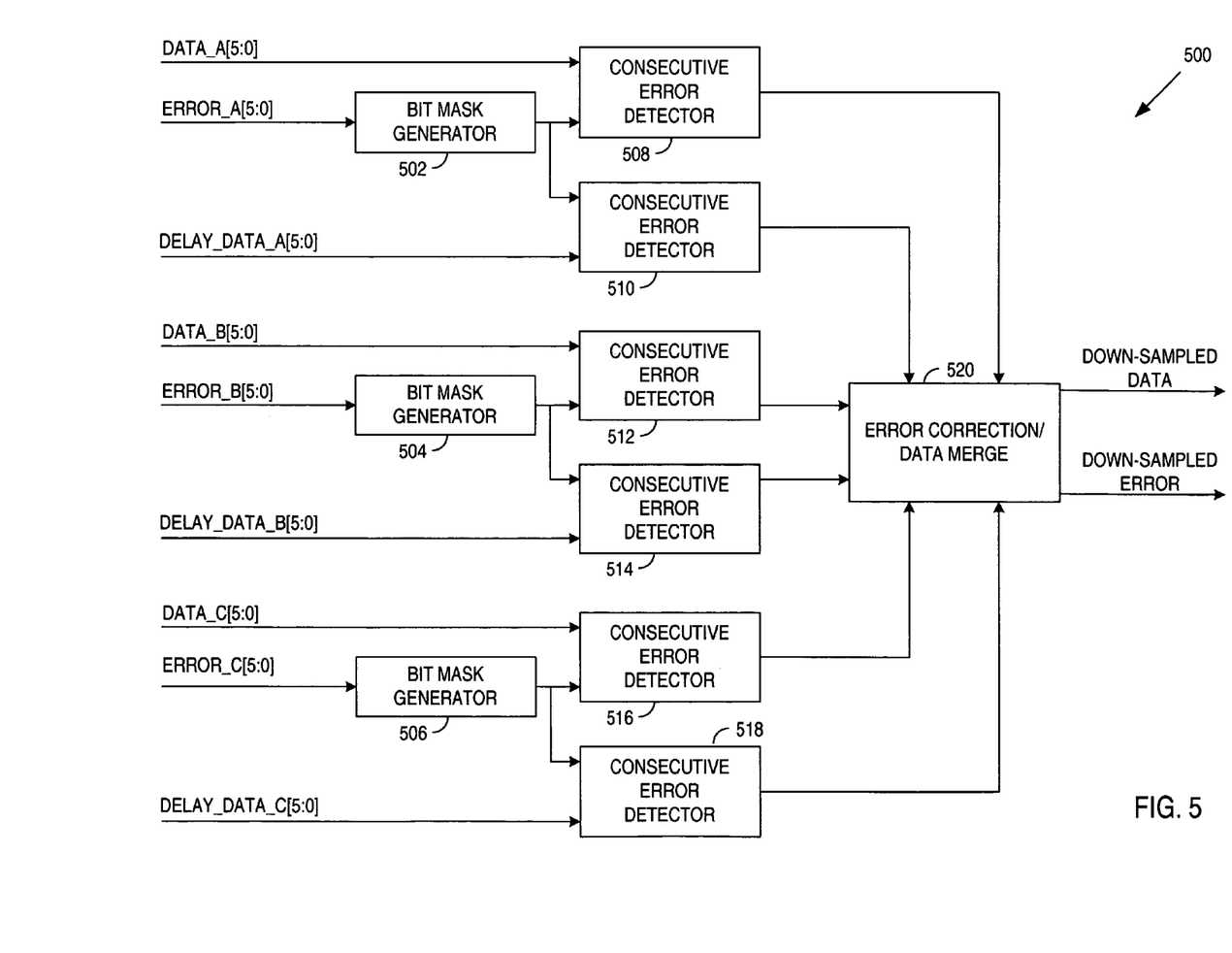
FIG. 5 illustrates an exemplary data recovery block diagram.
Figure 8:
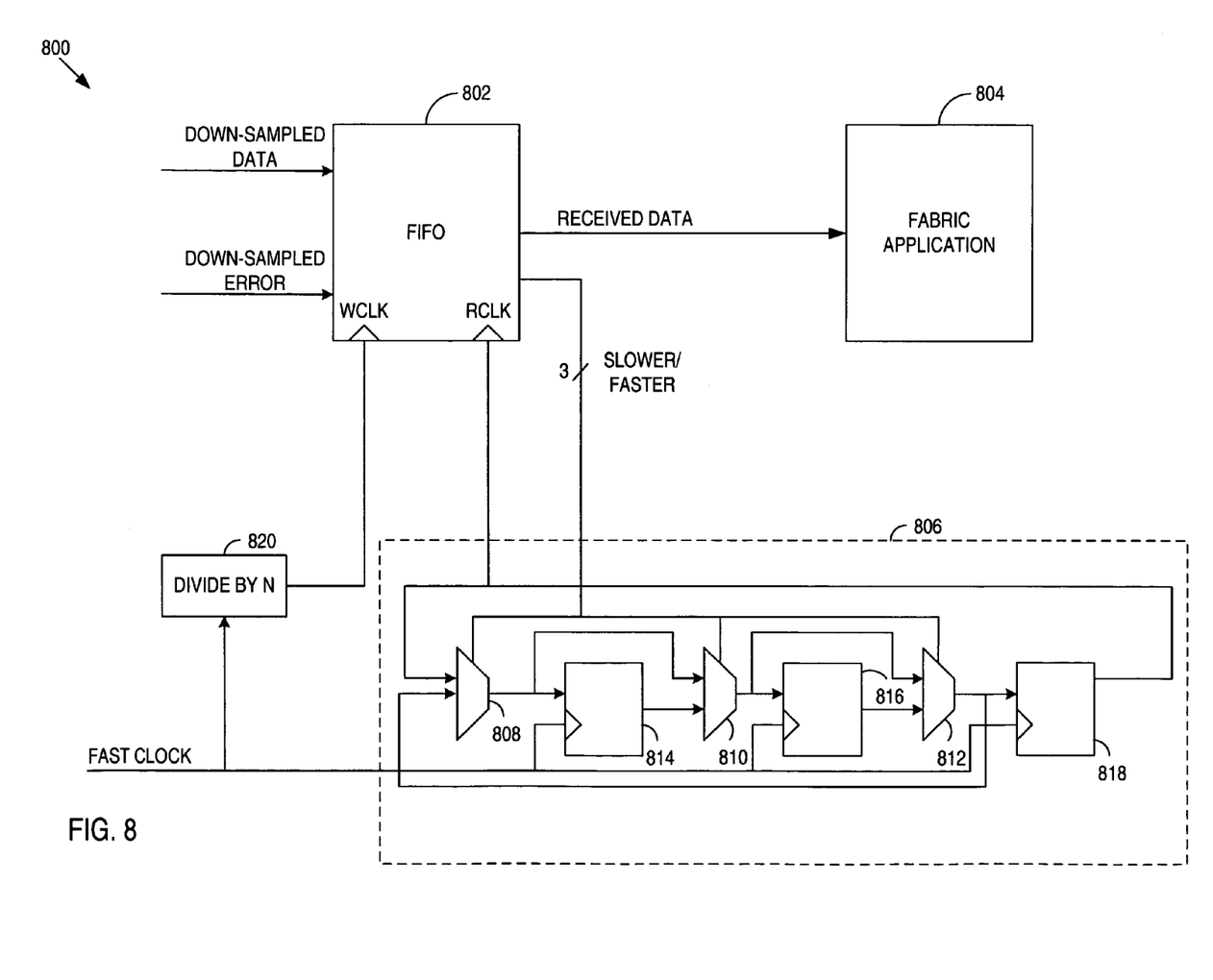
FIG. 8 illustrates an exemplary clock recovery block diagram.

Turning to FIG. 4, a flow diagram of the clock and data recovery operations is described in relation to the data recovery block diagram of FIG. 5 and the clock recovery block diagram of FIG. 8. In step 402, the initial error detection is performed, whereby the XOR logic function is performed upon the deserialized data and control paths of each receiver segment. In particular, XOR gate 236 performs an XOR logic function on the 6-bit deserialized data word from data SERDES 218 and the inverted, 6-bit deserialized control word from CTRL SERDES 224 of receiver segment 254. In receiver segment 256, XOR gate 238 performs an XOR logic function on the 6-bit deserialized data word from data SERDES 220 and the inverted, 6-bit deserialized control word from CTRL SERDES 226. Finally, in receiver segment 258, XOR gate 240 performs an XOR logic function on the 6-bit deserialized data word from data SERDES 222 and the inverted, 6-bit deserialized control word from CTRL SERDES 228.

In operation, the initial error detection of step 402 simply flags those bits that have been detected incorrectly. In normal operation, for example, the output of each XOR gate 236-240 would be expected to yield an all-zero data word, i.e., "000000", when no detection error has occurred, since the deserialized data bits and the inverted and deserialized control bits would be in agreement. If a detection error occurs, on the other hand, then not all bits in the data and control paths will be equal. Thus, by applying the XOR logic function, those bit(s) in the data and control paths that do not agree are flagged in the error data stream and further processed.

The initial error detection executed in step 402, however, may indicate that consecutive errors have occurred. Such may be the case, for example, when logic values of consecutive data bits are changing quickly as is the case when, for example, a "101010 . . . " data pattern is transmitted. In such an instance, the detected data pattern, DATA_A[5:0], generated by data SERDES 218 of receiver segment 254 may be equal to, for example, "10010X", which illustrates that an additional logic zero value was detected in the $3^{rd}$ bit position. Conversely, the control word, DELAY_DATA_A[5:0], generated by CTRL SERDES 224 of receiver segment 254 may be equal to, for example, "10100X", which illustrates that an additional logic zero value was detected in the $5^{th}$ bit position.

In such an instance, the error word, ERROR_A[5:0], generated by XOR gate 236 of receiver segment 254 is equal to "00110X", which indicates that consecutive bit errors have been flagged in the $3^{rd}$ and $4^{th}$ bit positions by initial error detection step 402. Since consecutive bit errors are flagged, further processing is performed to determine if bit position 3 or bit position 4 indicates the true error bit position.

In step 404, for example, bit mask generator 502 receives error word, ERROR_A[5:0], from XOR gate 236 and generates a first word, w1="000110", which is the error word shifted right by one bit position, and w2="0110XX", which is the error word shifted left by one bit position. Bit mask generator 502 then generates a bit mask by evaluating the logic OR of the error word, w1, and w2 as follows:

$$\text{bitmask} = \text{error word} \| w1 \| w2 = \text{"0111XX"}, \quad (1)$$

where "||" is the logic OR operator. Next, consecutive error detector 508 evaluates the logic AND of the bitmask from equation (1) and the detected data pattern, DATA_A="10010X", to generate the revised error word as follows:

$$\text{revised error word} = \text{bitmask \&\&} \\ \text{DATA\_A} = \text{"0010XX"}, \quad (2)$$

where "&&" is the logic AND operator.

Thus, it is determined in step 406 from the revised error word of equation (2), that bit 3 of DATA_A[5:0] contained the bit error. As such, both the revised error word and DATA_A[5:0] are forwarded by consecutive error detector 508 to error correction/data merge block 520 for the appropriate action to be taken as discussed in more detail below.

Consecutive error detections are similarly performed: on signal DELAY_DATA_A[5:0] of receiver segment 254 via bit mask generator 502 and consecutive error detector 510; on signal DATA_B[5:0] of receiver segment 256 via bit mask generator 504 and consecutive error detector 512; on signal DELAY_DATA_B[5:0] of receiver segment 256 via bit mask generator 504 and consecutive error detector 514; on signal DATA_C[5:0] of receiver segment 258 via bit mask generator 506 and consecutive error detector 516; and on signal DELAY_DATA_C[5:0] of receiver segment 258 via bit mask generator 506 and consecutive error detector 518.

As a result, deserialized data may be obtained from each DATA and DELAY_DATA path from each of the three receiver segments and forwarded to error correction/data merge block 520 by consecutive error detectors 508-518. In particular, 6-bit data words from receiver segments 254-258 may be organized into 6×6 matrices at each 6-bit data word boundary, where data word boundaries T=0, T=1, T=2, T=3 are exemplified in the matrix expressions of Table 1.

TABLE 1

$$T=0 \quad\quad T=1 \quad\quad T=2 \quad\quad T=3$$

$$\begin{bmatrix} 1 & 0 & 1 & 0 & 1 & 1 \\ 1 & 0 & 1 & 1 & 0 & 1 \\ 1 & 1 & 0 & 1 & 0 & 1 \\ 0 & 1 & 0 & 1 & 0 & 1 \\ 0 & 1 & 0 & 1 & 0 & 1 \\ 0 & 1 & 0 & 1 & 1 & 0 \end{bmatrix} \begin{bmatrix} 0 & 1 & 0 & 1 & 0 & 1 \\ 0 & 1 & 0 & 1 & 0 & 1 \\ 0 & 1 & 0 & 1 & 0 & 0 \\ 0 & 1 & 0 & 0 & 1 & 0 \\ 1 & 0 & 1 & 0 & 1 & 0 \\ 1 & 0 & 1 & 0 & 1 & 0 \end{bmatrix} \begin{bmatrix} 0 & 1 & 0 & 0 & 1 & 0 \\ 0 & 0 & 1 & 0 & 1 & 0 \\ 1 & 0 & 1 & 0 & 1 & 0 \\ 1 & 0 & 1 & 0 & 1 & 0 \\ 1 & 0 & 1 & 0 & 0 & 1 \\ 1 & 0 & 0 & 1 & 0 & 1 \end{bmatrix} \begin{bmatrix} 1 & 0 & 1 & 0 & 1 & 0 \\ 1 & 0 & 1 & 0 & 1 & 1 \\ 1 & 0 & 1 & 1 & 0 & 1 \\ 1 & 1 & 0 & 1 & 0 & 1 \\ 0 & 1 & 0 & 1 & 0 & 1 \\ 0 & 1 & 0 & 1 & 0 & 1 \end{bmatrix}$$

The data configuration for each matrix is as follows:

Row 1—Data/initially corrected error information receiver segment 254;

Row 2—Delay data/initially corrected error information receiver segment 254;

Row 3—Data/initially corrected error information receiver segment 256;

Row 4—Delay data/initially corrected error information receiver segment 256;

Row 5—Data/initially corrected error information receiver segment 258; and

Row 6—Delay data/initially corrected error information receiver segment 258. It should be noted that the sampled data exemplified by the matrices of expression (3) is representative of an alternating logic "1" logic "0" data pattern, e.g., "10101010 . . . ".

Similarly, error matrices may also be constructed in step 408 by consecutive error detectors 508-518 in relation to the matrices of Table 1, whereby the bit positions of consecutive errors are flagged in step 406 as follows:

TABLE 2

$$T=0 \quad\quad T=1 \quad\quad T=2 \quad\quad T=3$$

$$\begin{bmatrix} 0 & 0 & 0 & 0 & 1 & 0 \\ 0 & 0 & 1 & 0 & 0 & 0 \\ 1 & 0 & 0 & 0 & 0 & 0 \\ 0 & 0 & 0 & 0 & 0 & 0 \\ 0 & 0 & 0 & 0 & 0 & 1 \\ 0 & 0 & 0 & 1 & 0 & 0 \end{bmatrix} \begin{bmatrix} 0 & 0 & 0 & 0 & 0 & 0 \\ 0 & 0 & 0 & 0 & 0 & 0 \\ 0 & 0 & 0 & 0 & 1 & 0 \\ 0 & 0 & 1 & 0 & 0 & 0 \\ 0 & 0 & 0 & 0 & 0 & 0 \\ 0 & 0 & 0 & 0 & 0 & 0 \end{bmatrix} \begin{bmatrix} 0 & 0 & 1 & 0 & 0 & 0 \\ 1 & 0 & 0 & 0 & 0 & 0 \\ 0 & 0 & 0 & 0 & 0 & 0 \\ 0 & 0 & 0 & 0 & 0 & 0 \\ 0 & 0 & 0 & 1 & 0 & 0 \\ 0 & 1 & 0 & 0 & 0 & 0 \end{bmatrix} \begin{bmatrix} 0 & 0 & 0 & 0 & 0 & 0 \\ 0 & 0 & 0 & 0 & 1 & 0 \\ 0 & 0 & 1 & 0 & 0 & 0 \\ 1 & 0 & 0 & 0 & 0 & 0 \\ 0 & 0 & 0 & 0 & 0 & 0 \\ 0 & 0 & 0 & 0 & 0 & 1 \end{bmatrix}.$$

For example, the 5$^{th}$ column of the first row of error matrix, T=0 of Table 2, indicates that the 5$^{th}$ bit of row 1 of the data matrix, T=0 of Table 1, is in error. Similarly, the 3$^{rd}$ column of the second row of error matrix, T=0 of Table 2, indicates that the 3$^{rd}$ bit of row 2 of data matrix, T=0 of Table 1, is in error. It can be seen, therefore, that a one-to-one correspondence exists between each bit position of the error matrices of Table 2 and the respective bit position of the data matrices of Table 1. As such, a logic high existing within an error matrix indicates that the corresponding data bit is in error.

Figure 6A:
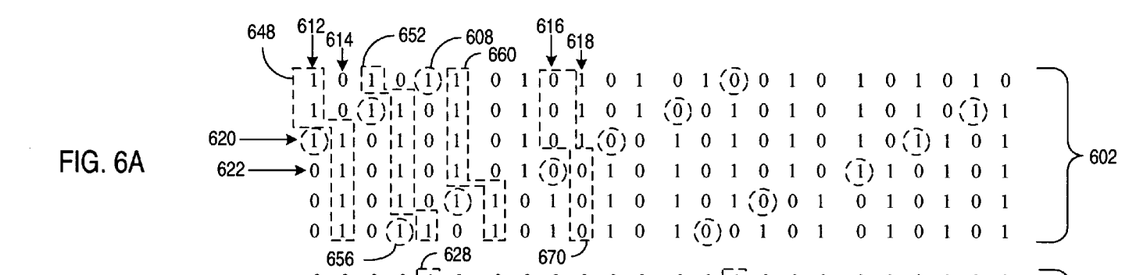
FIG. 6A illustrates exemplary detected data matrices generated by the data recovery block diagram of FIG. 5 during execution of the flow diagram of FIG. 4.
Figure 6B:
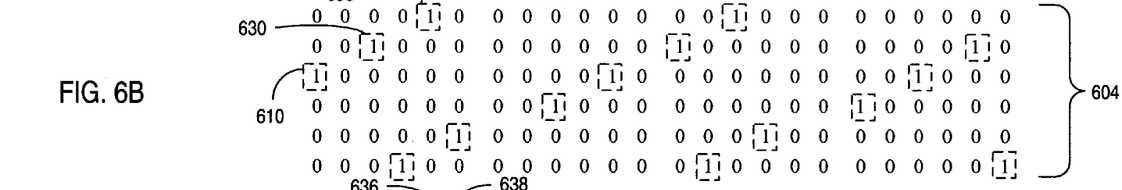
FIG. 6B illustrates exemplary error matrices generated by the data recovery block diagram of FIG. 5 during execution of the flow diagram of FIG. 4.

Turning to FIGS. 6A and 6B, a graphical representation of the matrices of Tables 1 and 2, respectively, are illustrated.

Data errors 608 contained within data matrices 602 are denoted by dashed circles and the corresponding error flags 610 within error matrices 604 are denoted with dashed squares. Upon inspection of matrices 602 and 604, it is noted that: 1) reading each row of matrices 602 from left to right reveals the "101010 . . . " detected data pattern, with occasional data errors 608 that represent consecutive data errors, i.e., data bits that have been detected twice; 2) with each duplicative bit detection, a corresponding error flag 610 is set within error matrices 604; and 3) reading each column of matrices 602 from top to bottom, detected data bits from each of the DATA and DELAY_DATA paths of receiver segments 254-258 are tabulated, whereby a shift to an adjacent data column occurs for each duplicative bit detection.

For example, the duplicative bit detection of column 612, row 620 of data matrix T=0 of data matrices 602, causes the tabulation of the detected logic high values to shift right one column, e.g., column 614, as illustrated by data block 648. Similarly, the duplicative bit detection of column 616, row 622, of data matrix T=1 of data matrices 602, causes the tabulation of the detected logic low values to shift right one column, e.g., column 618, as illustrated by data block 670. It can be seen, therefore, that for each duplicative bit detection, a columnar offset occurs, whereby data tabulation of detected logic values continues on the same row that the duplicative bit detection occurred, but shifts right to the adjacent column, thus creating the columnar offset.

Figure 6C:
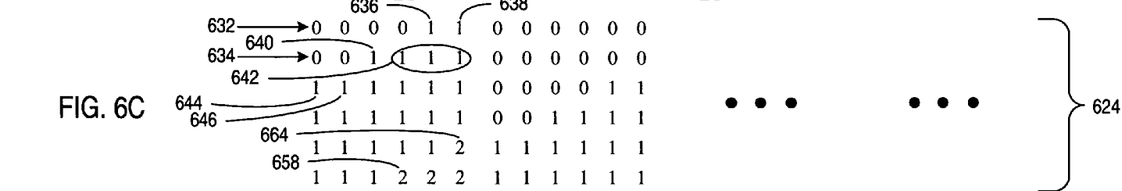
FIG. 6C illustrates exemplary offset matrices generated by the data recovery block diagram of FIG. 5 during execution of the flow diagram of FIG. 4.

The process of extracting the correct data bits from matrices 602, therefore, exploits information that may be derived from such a columnar offset. In particular, offset matrices 624 are constructed by data correction/data merge block 520 in step 414 of FIG. 4 to track the columnar offsets that are caused by the duplicative data detection. Each bit of each offset matrix is then used to construct an index pointer, as discussed in more detail below, which is used as a row/column index pointer into data matrices 602 for extraction of the correct data bits.

Figure 7A:
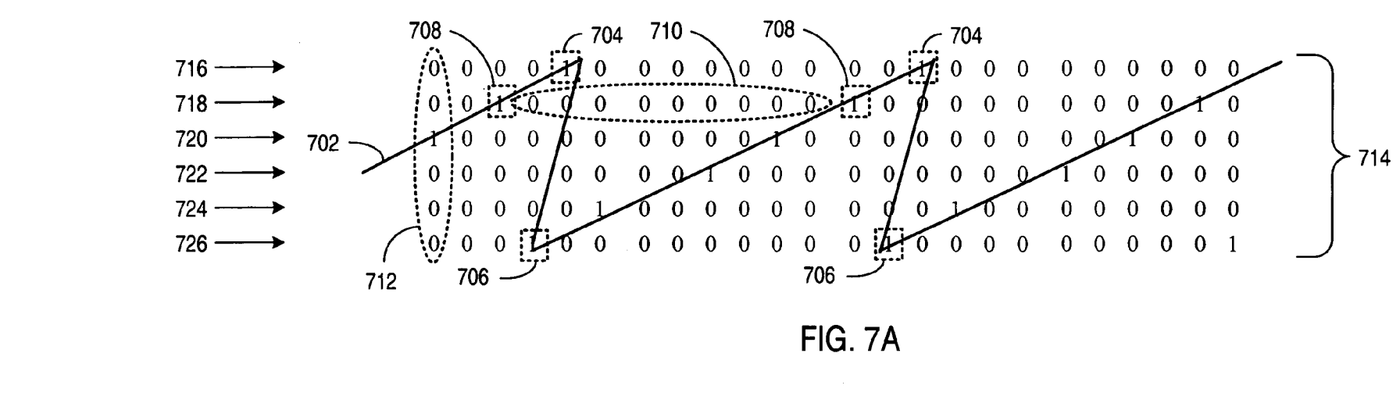
FIGS. 7A and 7B illustrate characteristics of the error matrices of FIG. 6B.

The XOR error detection method discussed above, however, may fail to detect hidden data errors when the data errors are present within an extended run length of non-toggling data bits. Turning to FIG. 7A, therefore, certain characteristics of error matrix behavior are identified, which facilitates the detection of hidden errors, as in step 410 of FIG. 4, that may be created by extended run lengths of non-toggling data bits.

It is noted, for example, that error bits (when correctly set) within error matrices 714 follow a sawtooth pattern as exemplified by pattern 702. As a result, the following observations of error matrices 714 may be made:

Observation #1—if an error bit is set in row 716 of error matrices 714, then an error bit must be set in the preceding column of row 726. That is to say, for example, that since column 5 of row 716 of the first error matrix, and column 3 of row 716 of the third error matrix, contains error bit 704, then column 4 of row 726 of the first error matrix, and column 2 of row 726 of the third error matrix, must also contain error bit 706;

Observation #2—if an error bit is set in any particular column, then no other errors should be set in the same column on any other row. That is to say, for example, that only one error bit should exist within any 6-sample data set of rows 716-726 as exemplified by data block 712;

Observation #3—if an error bit is set on any given row, then another error bit should be set ten columns over in the same row. For example, the existence of error bits 708 in row 718 necessitates that a nine column string of non-error bits 710 exists between them; and Observation #4—an error bit must be present along sawtooth pattern 702, whereby an error bit exists two columns to the right and one row above the previous error bit of the same matrix. For example, error bit 708 exists at row 718, $3^{rd}$ column, of the first error matrix, which necessitates error bit 704 at row 716, $5^{th}$ column of the same matrix.

Figure 7B:
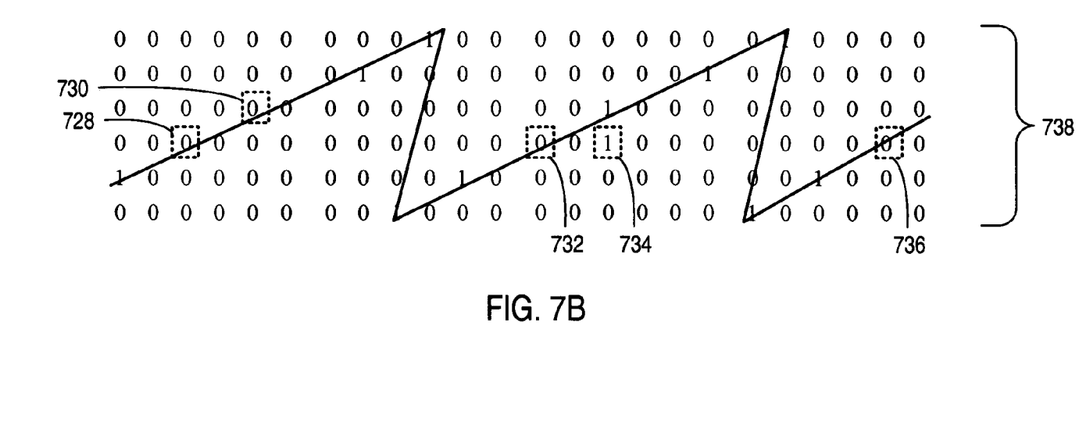

Application of the observations listed above may be illustrated in FIG. 7B, where correction of incorrectly populated error matrices 738, as in step 412, may be performed by error correction/data merge block 520. Error matrices 738, for example, may be populated, as discussed above in relation to steps 402-408, from the detection of the following data pattern: "1010110000", which may result in the incorrect population as exemplified in error matrices 738. Observation #4, for example, mandates that error bits 728, 730, and 736 must indicate an error. As such, the logic value of error bits 728, 730, and 736 are changed in step 412 from a logic low value to a logic high value. Error bit 732 is violative of observation #3, thus its value is changed in step 412 from a logic low value to a logic high value. Error bit 734 is violative of observation #2 and is thus changed in step 412 from a logic high value to a logic low value.

Turning to FIG. 6C, offset matrices 624 are constructed by error correction/data merge block 520 of FIG. 5 as in step 414, once all errors (if any) from error matrices 604 have been removed as in step 412. Step 414 begins with the initialization of offset matrices 624 to all logic zero values. Next, each error matrix of error matrices 604 is scanned row by row for error flags. Upon detection of an error flag, the corresponding bit in the corresponding row of the offset matrix is incremented. All remaining bits of the corresponding row of the offset matrix are likewise incremented. Rows below populated positions are likewise incremented, but only during the first initialization cycle.

For example, scanning the first row of the first error matrix of error matrices 604, error flag 628 is detected. Accordingly, bit 636 of row 632 of the first offset matrix is incremented from a zero to a one. Bit 638 is also incremented as it is the last remaining bit of row 632. Similarly, scanning the second row of the first error matrix of error matrices 604, error flag 630 is detected. Accordingly, bit 640 of row 634 of the first offset matrix is incremented from a zero to a one. Bits 642 of row 634 are also incremented as they are the last remaining bits of row 634. Similarly, scanning the third row of the first error matrix of error matrices 604, error flag 610 is detected. Accordingly, bit 644, as well as the remaining bits, of the third row of the first offset matrix is incremented from a zero to a one. In addition, each bit position of rows four through six of offset matrices 624 are incremented due to the existence of error bit 610. The remaining bits of offset matrices 624 are similarly populated as illustrated in FIG. 6C.

Next, an index pointer is constructed in step 416, whose row and column indices are used as the address to the correct data bits of data matrices 602. The address of the index pointer is first initialized to (row=1,column=1), such that the index pointer addresses the (1,1) data bit of the first data matrix of data matrices 602. Next, offset information is obtained from the corresponding offset bit located at the (1,1) bit location of the first offset matrix of offset matrices 624. Since the offset bit is at a zero value, a zero offset exists, such that the first correct data bit to be extracted in step 418 exists at the (1,1) bit location of the first data matrix of data matrices 602. Since a logic high value exists at that location, a logic high value is written into the (1,1) bit location of the first extracted data matrix of extracted data matrices 626 of FIG. 6D.

Figure 6D:
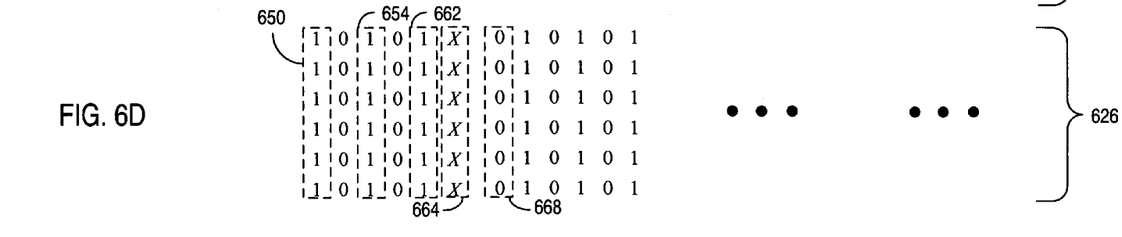
FIG. 6D illustrates exemplary extracted data matrices generated by the data recovery block diagram of FIG. 5 during execution of the flow diagram of FIG. 4.

The process of the data bit extraction of steps 416-418 continues in a vertical direction along each column of each data matrix. Thus, the next data bit to be extracted exists at location (2,1), or in other words, the second row of the first column of the first data matrix of data matrices 602. Since the corresponding offset bit of the first offset matrix contains a zero value, a zero offset exists, whereby data bit (2,1) is extracted from the first data matrix and written into location (2,1) of the first extracted data matrix of extracted data matrices 626.

The index pointer is then incremented to a value of (3,1). Since a data error exists at that location, the corresponding offset data 644 indicates an offset of one. Thus, the column coordinate of the index pointer is first incremented by one to (3,2) prior to data extraction. The next data bit is then read from position (3,2) of the first data matrix, or in other words, data extraction continues along column 614 at row 620 of the first data matrix. Once the first column of data extraction is complete, data block 648 of the first data matrix is written into data block 650 of the first extracted data matrix of extracted data matrices 626 of FIG. 6D. The index pointer is then reset to a value of (1,2), such that the index pointer addresses the (1,2) data bit of the first data matrix of data matrices 602. Data extraction from the first data matrix of data matrices 602 then continues in accordance with the offset information of offset matrices 624 as discussed above.

It is noted, that multiple offsets may occur during data extraction for a single column of data, as illustrated during the extraction of data block 652 from data matrices 602 into extracted data block 654 of extracted data matrices 626. In particular, the index pointer is reset to a value of (1,3). Since the corresponding offset bit of the first offset matrix is zero, then data extraction begins with data bit (1,3) of the data matrix. The second bit to be extracted is located at location (2,3), however, it is an error data bit. Thus, the corresponding offset bit 640 has a value of one, which causes the column coordinate of the index pointer to increment by one, i.e., index pointer=(2,4).

Data extraction continues along column 4 of the first data matrix until the second data error is encountered. In particular, data error 656 of the first data matrix causes a second columnar offset to occur as indicated by corresponding offset bit 658 having a value of 2. As such, the column coordinate of the index pointer is incremented again by one, i.e., index pointer=(6,5), such that the last bit of extracted data block 654 is taken from bit position (6,5) of the first data matrix of data matrices 602.

By incrementing the index pointer in accordance with the offset bits of offset matrices 624, it is noted that "borrowing" of data bits from an adjacent data matrix may occur. Turning to data block 660, for example, data is extracted from the first data matrix using an index pointer=(1,5) and then placed into data block 662 of the first extracted data matrix of extracted data matrices 626. Since an error bit exists at index pointer= (1,5), however, the corresponding offset bit 636 has a value of one, which causes the column coordinate of the index pointer to increment by one, i.e., index pointer=(1,6).

Data extraction continues along column 6 of the first data matrix until the second data error is encountered. In particular, the data error at position (5,6) of the first data matrix causes a second columnar offset to occur as indicated by corresponding offset bit 664 having a value of 2. As such, the column coordinate of the index pointer is incremented again by one, i.e., index pointer=(5,1), such that the last two bits of extracted data block 662 are borrowed from bit positions (5,1) and (6,1) of the second data matrix of data matrices 602.

At this point, all valid data bits are extracted from the first data matrix of data matrices 602. Data block 664 of the first extracted data matrix of extracted data matrices 626 is, therefore, marked with don't care logic values, i.e., X, so as to indicate that the next valid extracted data column is data block 668 of the second extracted data matrix.

Offset data from the last column of the first offset matrix of offset matrices 624 is then carried over to the first column of the second offset matrix. In order to reduce the accumulative effects of "borrowing", however, the offset data is decremented prior to being carried over, provided that the offset data to be carried over has a value of one or greater at position (1,6) of the first offset matrix. All offset bits in the same column are then decremented by one before being carried over to the next offset matrix.

Bit 638, for example, has a value of one, which is decremented to zero prior to being carried over to the first bit of the first column of the second offset matrix. Similarly, bit 664 has a value of two, which is decremented to one prior to being carried over to the fifth row of the first column of the second offset matrix. The remaining bits within the fifth row of the second offset matrix must then be populated with matching offset data as discussed above. Once the second offset matrix is populated, the second extracted data matrix may be formed in a similar fashion as discussed above.

Since each 6-bit column of extracted data matrices 626 represents a single bit, down-sampling must be performed as in step 420. In particular, a majority vote is taken on each 6-bit sample from each column, which results in a single, down-sampled bit for each 6-bit column. In an alternate embodiment, the four center bits from rows 2-5 are instead used in the majority vote, in order to mitigate errors introduced by noise and jitter. Thus, down-sampled data stream, DOWN-SAMPLED DATA, as generated by error detection/data merge block 520 from extracted data matrices 626, is equal to "10101X010101 . . . ". The don't care value, "X", down-sampled from data block 664, is flagged in a corresponding error data stream, DOWN-SAMPLED ERROR, as generated by error detection/data merge block 520 from extracted data matrices 626, and is equal to "000001000000 . . . ".

Turning to FIG. 8, a clock recovery block diagram is exemplified. The down-sampled data stream from error correction/data merge 520 is stored into a ring buffer, e.g., FIFO 802, as in step 420. The down-sampled data is written into FIFO 802 as 6-bit data words, since the SERDES of FIG. 2 are operating at a deserialization factor of six. Thus, each of 6×6 extracted data matrices 626 is collapsed into a single 6-bit data word by the down sampling algorithm. It is noted, that data bits corresponding to logic high data values within error signal, DOWN-SAMPLED ERROR, are ignored and are not written into FIFO 802.

Thus, each valid data word from error correction/data merge block 520 of FIG. 5 is written into an input data register of FIFO 802 via signal WCLK. WCLK is derived from the signal FAST CLOCK, e.g., sampling clock 326 of FIG. 3, by dividing signal FAST CLOCK by integer N in block 820. In one embodiment, N is equal to 3 when a DDR implementation, as discussed herein, is utilized.

Adaptive clock recovery block 806 generates a recovered clock, via a multiplexed shift register, whereby the recovered clock is used to read data from the output register of FIFO 802, via signal RCLK, into PLD fabric application block 804. The bit length of shift register 806 is dependent upon the average frequency of the recovered clock that is required. In one embodiment, the nominal frequency of the recovered clock is equal to FAST CLOCK/3, therefore, a 3-stage shift register is utilized.

Generally speaking, the frequency of the recovered clock signal may be increased by dynamically utilizing fewer shift register stages from the multiplexed shift register. Similarly, the frequency of the recovered clock signal may be decreased by dynamically utilizing more shift register stages from the multiplexed shift register. In particular, multiplexers 808-812 are placed between shift register stages 814-818 as illustrated. As such, each multiplexer may select the output from the immediately preceding shift register stage to decrease the frequency of the recovered clock signal. Conversely, each multiplexer may select the bypass path, which bypasses the output from the immediately preceding shift register stage to increase the frequency of the recovered clock signal.

Thus, in order to prevent an underrun or an overrun condition, FIFO 802 may adapt the frequency of signal RCLK through the use of signal SLOWER/FASTER. If one of multiplexers 808-812 is currently selecting the output of its immediately preceding shift register stage, for example, then a bypass output may instead be selected by FIFO 802 to effectively increase the frequency of signal RCLK in case of a potential overrun condition. In particular, data may be read from FIFO 802 faster by effectively removing one stage from shift register 806.

Alternately, a decrease in the frequency of signal RCLK may be requested by FIFO 802, in case of a potential underrun condition. In particular, if a bypass path is currently selected by one of multiplexers 808-812, then the output from the immediately preceding shift register stage may instead by selected to effectively decrease the frequency of signal RCLK to preclude the underrun condition by effectively adding one stage to shift register 806. Thus, the average frequency of signal RCLK may be effectively adapted by FIFO 802 to appropriately regulate read cycles from FIFO 802 to prevent overrun and underrun conditions.

It is noted, that the clock and data recovery algorithm discussed above in relation to FIG. 4 may be repeated for each data block received. That is to say, for example, that the data, error, offset, and extracted data matrices of consecutive error detectors 508-518 and error correction/data merge block 520, may be populated with a first block of data and then processed in accordance with the flow diagram of FIG. 4, while a second block of data is being gathered. In this way, most of the processing overhead may be removed by performing clock and data recovery on a first block of data in parallel with receiving a second block of data. Data processing on the second block of data may then commence, while the third block of data is being gathered and so on.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A clock and data recovery circuit, comprising:
   a plurality of receiver segments coupled to receive an input data stream, wherein each receiver segment includes a plurality of deserializers adapted to sample programmably delayed representations of the input data stream to generate a plurality of data words; and
   an error correction block coupled to receive the plurality of data words and adapted to remove duplicative data from the plurality of data words and merge each of the plurality of data words into detected data words.

2. The clock and data recovery circuit of claim 1, wherein each of the plurality of receiver segments comprises:
   a first data path comprising a first delay block adapted to delay the input data stream by a first programmable delay amount to generate a first delayed data stream; and
   a second data path comprising a second delay block adapted to delay the input data stream by a second programmable delay amount to generate a second delayed data stream.

3. The clock and data recovery circuit of claim 2, wherein the first data path further comprises a first deserialization block adapted to sample the first delayed data stream to generate first data words.

4. The clock and data recovery circuit of claim 3, wherein the second data path further comprises:
   a second deserialization block adapted to sample the second delayed data stream to generate second data words; and
   an inverter coupled to receive the second data words and adapted to generate inverted data words.

5. The clock and data recovery circuit of claim 4, wherein each of the plurality of receiver segments further comprises a logic gate coupled to receive the first data words and the inverted data words and adapted to generate error data words.

6. The clock and data recovery circuit of claim 5, wherein each of the plurality of receiver segments further comprises a bit mask generator coupled to receive the error data words and adapted to generate bit masks in response to the error data words.

7. The clock and data recovery circuit of claim 6, wherein each of the plurality of receiver segments further comprises a first error detector coupled to receive the first data words and the bit masks and adapted to detect errors in the first data words.

8. The clock and data recovery circuit of claim 7, wherein each of the plurality of receiver segments further comprise a second error detector coupled to receive the inverted data words and the bit masks and adapted to detect errors in the second data words.

9. The clock and data recovery circuit of claim 8, further comprising an error correction block adapted to receive detected errors from the first and second error detectors of each of the plurality of receiver segments and adapted to provide the detected data words, the detected data words being void of the detected errors.

10. A method of recovering data signals from an input data stream having a data rate, comprising:
    generating a plurality of data word streams from data samples taken from a plurality of data bit streams, each data bit stream exhibiting a different delay in relation to the input data stream;
    detecting error bits within the plurality of data words;
    extracting data bits from the plurality of data words, the extracted data bits being void of the detected error bits; and
    down-sampling the extracted data bits to recover the data signals from the input data stream.

11. The method of claim 10, wherein generating a plurality of data words comprises sampling each data bit stream using a sampling frequency that is less than twice the data rate.

12. The method of claim 10, wherein detecting error bits within the plurality of data words comprises:
    populating detected data matrices with the plurality of data word streams;
    detecting errors in the plurality of data word streams; and
    populating error matrices with the detected errors, wherein each location of each error matrix is indicative of a potential error in a corresponding location of each detected data matrix.

13. The method of claim 12, wherein detecting errors comprises:
- performing a logic function on selected data word stream pairs to generate an error word stream;
- generating bit masks from the error word stream; and
- performing a logic function with the bit masks and the selected data word stream pairs to detect duplicate data bits in the detected data matrices.

14. The method of claim 12, wherein extracting data bits comprises:
- comparing the detected errors within the error matrices to a set of observed rules; and
- correcting the detected errors within the error matrices in accordance with the observed rules.

15. The method of claim 14, wherein extracting data bits further comprises:
- populating offset matrices with data that corresponds to the corrected error matrices;
- generating an index pointer from data contained within the offset matrices;
- addressing locations within the detected data matrices using the index pointer; and
- copying data from each addressed location of the detected data matrices to a corresponding location within extracted data matrices.

16. The method of claim 15, wherein down-sampling the extracted data bits comprises:
- extracting data from each column of the extracted data matrices;
- performing a majority vote on the extracted column data; and
- forming detected data words from a plurality of majority votes.

17. In a programmable logic device, a method of recovering data signals from an input data stream comprises:
- receiving the input data stream using input/output pins of the programmable logic device;
- routing the input data stream to a plurality of receiver segments associated with the input/output pins;
- delaying the input data stream in each receiver segment using a programmable delay for each receiver segment;
- generating a plurality of data words from data samples taken from the delayed data streams in each receiver segment;
- extracting non-duplicative data bits from the plurality of data words; and
- down-sampling the extracted data bits to recover the data signals from the input data stream.

18. The method of claim 17, wherein extracting non-duplicative data bits comprises:
- populating detected data matrices with the plurality of data words;
- detecting errors in the plurality of data words; and
- populating error matrices with the detected errors, wherein each location of each error matrix is indicative of a potential error in a corresponding location of each detected data matrix.

19. The method of claim 18, wherein extracting non-duplicative data bits further comprises:
- populating offset matrices with data that corresponds to the error matrices;
- generating an index pointer from data contained within the offset matrices;
- addressing locations within the detected data matrices using the index pointer; and
- copying data from each addressed location of the detected data matrices to a corresponding location within extracted data matrices.

20. The method of claim 19, wherein down-sampling the extracted data bits comprises:
- extracting data from each column of the extracted data matrices;
- performing a majority vote on the extracted column data; and
- forming the recovered data signals from a plurality of majority votes.

* * * * *